United States Patent
Razavi

(10) Patent No.: US 7,396,888 B2
(45) Date of Patent: Jul. 8, 2008

(54) CATALYST SYSTEM COMPRISING A MIXTURE OF CATALYST COMPONENTS FOR PRODUCING A POLYOLEFIN BLEND

(75) Inventor: Abbas Razavi, Nivelles (BE)

(73) Assignee: TOTAL Petrochemicals Research Feluy, Feluy (BE)

( * ) Notice: Subject to any disclaimer, the term of this patent is extended or adjusted under 35 U.S.C. 154(b) by 332 days.

(21) Appl. No.: 10/491,360

(22) PCT Filed: Sep. 26, 2002

(86) PCT No.: PCT/EP02/10942

§ 371 (c)(1), (2), (4) Date: Dec. 23, 2004

(87) PCT Pub. No.: WO03/029303

PCT Pub. Date: Apr. 10, 2003

(65) Prior Publication Data

US 2005/0119425 A1    Jun. 2, 2005

(30) Foreign Application Priority Data

Sep. 27, 2001 (EP) .................... 01203656

(51) Int. Cl.
*C08F 4/6592* (2006.01)
*C08F 4/6392* (2006.01)

(52) U.S. Cl. .............. 526/114; 526/113; 526/118; 526/119; 526/127; 526/160; 526/351; 502/103; 502/152; 502/129

(58) Field of Classification Search ............ 526/113, 526/114, 118, 119, 127, 160, 351; 502/103, 502/129, 152

See application file for complete search history.

(56) References Cited

U.S. PATENT DOCUMENTS

| | | | |
|---|---|---|---|
| 5,036,034 A | 7/1991 | Ewen | |
| 5,350,817 A | 9/1994 | Winter et al. | |
| 5,623,022 A | 4/1997 | Sugano et al. | |
| 5,714,427 A * | 2/1998 | Winter et al. | 502/117 |
| 6,143,683 A * | 11/2000 | Shamshoum et al. | 502/103 |
| 6,143,846 A | 11/2000 | Herrmann et al. | |
| 6,207,606 B1 | 3/2001 | Lue et al. | |
| 6,362,125 B1 * | 3/2002 | Shamshoum et al. | 502/152 |
| 6,369,175 B1 | 4/2002 | Ewen | |
| 6,492,472 B2 | 12/2002 | Lue et al. | |
| 2005/0020438 A1 | 1/2005 | Razavi | |

FOREIGN PATENT DOCUMENTS

| | | |
|---|---|---|
| EP | 0277004 A1 | 8/1988 |
| EP | 0427696 A2 | 5/1991 |
| EP | 0742227 A2 | 11/1996 |
| WO | WO 93/19103 | 9/1993 |

* cited by examiner

*Primary Examiner*—Roberto Rábago
(74) *Attorney, Agent, or Firm*—Diane L. Kilpatrick-Lee; William D. Jackson

(57) ABSTRACT

Provided is a catalyst system for producing a polyolefin blend, which catalyst system comprises a mixture including the following catalyst components: i) a catalyst component A capable of producing an isotactic olefin polymer, and/or a catalyst component A' capable of producing a polymer comprising an isotactic polyolefin block; and ii) a catalyst component B capable of producing a syndiotactic polyolefin, and/or a catalyst component B' capable of producing a polymer comprising a syndiotactic polyolefin block; wherein each of the components in the catalyst system is distinct from the other components in the catalyst system.

18 Claims, No Drawings

CATALYST SYSTEM COMPRISING A MIXTURE OF CATALYST COMPONENTS FOR PRODUCING A POLYOLEFIN BLEND

The present invention relates to a catalyst system for use in preparing isotactic polyolefin/syndiotactic polyolefin blends, especially isotactic polypropylene/syndiotactic polypropylene (iPP/sPP) blends. The invention further relates to a catalyst system comprising metallocene catalyst components and a process for producing iPP/sPP blends using the catalyst system.

Olefins having 3 or more carbon atoms can be polymerised to produce a polymer with an isotactic stereochemical configuration. For example, in the polymerisation of propylene to form polypropylene, the isotactic structure is typically described as having methyl groups attached to the tertiary carbon atoms of successive monomeric units on the same side of a hypothetical plane through the main chain of the polymer. This can be described using a three dimensional stereochemical representation and the corresponding Fischer projection formula as follows:

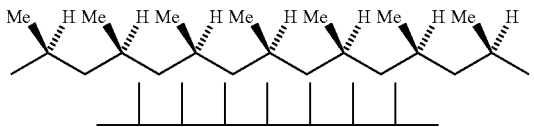

Another way of describing the structure is through the use of NMR spectroscopy. Bovey's NMR nomenclature for an isotactic pentad is "mmmm" with each "m" representing a "meso" diad or successive methyl groups on the same side in the plane.

In contrast to the isotactic structure, syndiotactic polymers are those in which the methyl groups attached to the tertiary carbon atoms of successive monomeric units in the chain lie on alternate sides of the plane of the polymer. The structure of a syndiotactic polymer is described as follows using a three dimensional stereochemical representation and the corresponding Fischer projection formula:

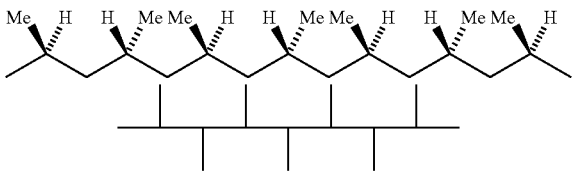

In NMR nomenclature, a syndiotactic pentad is described as "rrrr" in which "r" represents a "racemic" diad with successive methyl groups on alternate sides of the plane.

In contrast to isotactic and syndiotactic polymers, an atactic polymer exhibits no regular order of repeating unit. Unlike syndiotactic or isotactic polymers, an atactic polymer is not crystalline and forms essentially a waxy product.

It is desirable to form blends of isotactic and syndiotactic polyolefins, in particular blends of iPP and sPP. For instance, sPP is generally sticky, which reduces its processibility. This stickiness can be reduced by blending sPP with iPP. In addition, sPP gives high transparency and flexibility in injection blow moulding and injection moulding, whilst iPP gives improved processibility and faster solidification. These advantageous properties can be optimised by blending the two polymers.

Moreover, the softness of polypropylene fibres can be improved by incorporating sPP in iPP, whilst the thermal bonding properties of non-woven fibres can be improved also by incorporating sPP in iPP. By blending a small quantity of sPP with iPP the modulus of polypropylene films can be reduced thus forming films that are less stiff, whilst simultaneously improving the heat shrink, tear resistance and impact resistance properties of the films.

The low crystallisation rate of sPP can be problematic, when processing sPP in a melt. However, the crystallisation rate of iPP is much greater that that of sPP. By incorporating some iPP in sPP, it is possible to increase the crystallisation rate of sPP in the melt mixture, since as the melt cools, iPP crystallises relatively quickly and serves to seed the crystallisation of sPP. Thus, for this additional reason, it is desirable to form blends of iPP and sPP.

In order to take advantage of the favourable properties of both isotactic and syndiotactic polyolefins, it is known to prepare a physical blend of such polyolefins. However, the properties of the above known physical blends still fall short of the properties which should be achievable from homogeneous reactor blends. This is because polyolefins are generally resistant to blending, in part due to the length of the polymer chains which hinders the intimate intermingling of individual molecules. Furthermore, physical blending is costly, requiring energy to heat the polymer components and to co-extrude the components through a die and sometimes lead to polymer degradation and property changes.

It is an object of the present invention to overcome the above problems associated with the physical blending of isotactic and syndiotactic polyolefins. Accordingly, the present invention provides a catalyst system for producing a polyolefin blend, which catalyst system comprises a mixture including the following catalyst components:

(i) a catalyst component A capable of producing an isotactic olefin polymer, and/or a catalyst component A' capable of producing a polymer comprising an isotactic polyolefin stereoblock; and (ii) a catalyst component B capable of producing a syndiotactic polyolefin, and/or a catalyst component B' capable of producing a polymer comprising a syndiotactic polyolefin stereoblock;

wherein each of the components in the catalyst system is distinct from the other components in the catalyst system.

In the context of the present invention, catalysts of type A and B mean catalysts capable of producing substantially homopolymeric isotactic polyolefin and substantially homopolymeric syndiotactic polyolefin respectively. Catalysts of type A' and B' mean catalysts capable of producing block co-polymers of light olefins which comprise predominantly isotactic polyolefin blocks or predominantly syndiotactic polyolefin blocks respectively. The further blocks in the block co-polymers are not especially limited and may be blocks formed from olefin monomers, or blocks formed from other monomers.

The catalyst system of the present invention comprises at least two different catalyst components, one component of type A (and/or A') and one component of type B (and/or B'). Thus, the present catalyst system may comprise any of the following component combinations:

A+B
A+B'
A'+B
A'+B'
A+B+A'
A+B+B'

A+B'+A'
A+B+B'; and
A+A'+B+B' as well as further catalyst components, if desired.

In the case where a catalyst component is capable of producing an olefin polymer comprising both isotactic and syndiotactic blocks, then this catalyst component is simultaneously of component type A' and component type B' and in the present context is termed an A'B' component. However, for the avoidance of doubt, the present system cannot comprise one A'B' component alone, since the component of type (i) should be a different catalyst from the component of type (ii) in order that the catalyst system is capable of producing at least two substantially different polyolefins. However, the present catalyst system may comprise two different A'B' components.

The present invention further provides a method for producing a blend of an isotactic polyolefin and a syndiotactic polyolefin, which method comprises polymerising an olefin monomer in the presence of a catalyst system as defined above.

The use of a catalyst mixture to produce an in situ mixture of isotactic polyolefin and syndiotactic polyolefin (a chemical blending process) leads to polymer blends (chemical blends) that are much more homogeneous than known blends produced by a physical blending process. The improved homogeneity of the present blends contributes to their improved physical and mechanical properties.

Thus, the polymer blends produced by the catalyst system of the present invention have improved processibility and solidification properties in injection blow moulding and injection moulding, whilst simultaneously showing high transparency and flexibility. Fibres formed from the present blends have improved softness and improved thermal bonding characteristics. Films produced from the present blends have a reduced modulus, being less stiff and have improved heat shrink, tear resistance and impact resistance characteristics.

Typically, in the present catalyst system catalysts components (i) and (ii) are metallocene compounds. However, the catalyst components (i) and (ii) used in the present catalyst system for producing the iPP/sPP blend are not particularly limited, provided that they can be mixed with each other.

In a preferred embodiment of the present invention, the catalyst component (i) comprises a catalyst A having the following formula:

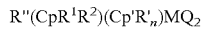

wherein Cp is a substituted cyclopentadienyl ring; Cp' is a substituted or unsubstituted fluorenyl ring; R" is a structural bridge imparting stereorigidity to the component; $R^1$ is a substituent on the cyclopentadienyl ring which is distal to the bridge, which distal substituent comprises a bulky group of the formula $XR^*_3$ in which X is an atom from group IVA and each R* is the same or different and is chosen from a hydrogen or a hydrocarbyl group having from 1-20 carbon atoms, $R^2$ is a substituent on the cyclopentadienyl ring which is proximal to the bridge and positioned non-vicinal to the distal substituent and is a hydrogen or is of the formula $YR\#_3$ in which Y is an atom from group IVA, and each R# is the same or different and is chosen from a hydrogen or a hydrocarbyl group having from 1-7 carbon atoms, each R' is the same or different and is a hydrocarbyl group having from 1-20 carbon atoms, and n is an integer of from 0-8; M is a metal atom from group IVB or is vanadium; and each Q is a hydrocarbon having from 1-20 carbon atoms or is a halogen;

and/or a catalyst A having the following formulae:

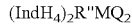

wherein each Ind is the same or different and is a substituted or unsubstituted indenyl group, wherein each $IndH_4$ is the same or different and is a substituted or unsubstituted tetrahydroindenyl group, R' is a structural bridge imparting stereorigidity to the component, R" is a structural bridge imparting stereorigidity to the component; M is a metal atom from group IVB or is vanadium; and each Q is a hydrocarbon having from 1-20 carbon atoms or is a halogen. Preferably the structural bridge comprises a $C_1$-$C_4$ alkylene group.

In common with catalyst A, the catalyst B used in component (ii) of the present catalyst system for producing the syndiotactic polyolefin is not particularly limited, provided that it can be mixed with catalyst component (i). It is preferred in the present invention that the catalyst B is a catalyst having the following formula:

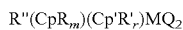

wherein Cp is a substituted or unsubstituted cyclopentadienyl ring; Cp' is a substituted or unsubstituted fluorenyl ring; R" is a structural bridge imparting stereorigidity to the component; each R is the same or different and is a hydrocarbyl group having from 1-20 carbon atoms; each R' is the same or different and is a hydrocarbyl group having from 1-20 carbon atoms; m is an integer of from 0-4; r is an integer from 0-8; M is a metal atom from group IVB or is vanadium; and each Q is a hydrocarbon having from 1-20 carbon atoms or is a halogen. Preferably the $CpR_m$ group possesses bilateral symmetry and more preferably is unsubstituted (m=0).

Preferred catalysts of type A' are those having the following formula.

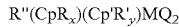

wherein Cp is a substituted cyclopentadienyl ring; Cp' is a substituted or unsubstituted fluorenyl ring; R" is a structural bridge imparting stereorigidity to the component; each R is the same or different and is a hydrocarbyl group having from 1-20 carbon atoms, each R' is the same or different and is a hydrocarbyl group having from 1-20 carbon atoms, and x and y are independently an integer of from 0-4 and 0-8 respectively; M is a metal atom from group IVB or is vanadium; and each Q is a hydrocarbon having from 1-20 carbon atoms or is a halogen; wherein the $CpR_x$ group lacks bilateral symmetry. In a preferred embodiment, the Cp group is substituted at the 3-position. Particularly preferably the substituent comprises a trimethylsilyl group.

Preferred catalysts of type B' are those having the following formula:

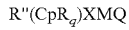

wherein Cp is a substituted or unsubstituted cyclopentadienyl ring or a substituted or unsubstituted fluorenyl ring; R" is a structural bridge between Cp and X imparting stereorigidity to the component; each R is the same or different and is selected from a hydrocarbyl group having from 1-20 carbon atoms, a halogen, an alkoxy group, an alkoxyalkyl group, an alkylamino group or an alkylsilylo group; when Cp is a cyclopentadienyl ring; q is an integer from 0-4; and when Cp is a fluorenyl ring q is an integer from 0-8; X is a heteroatom from group VA or group VIA; M is a metal atom from group IIIB, IVB, VB or VIB in any of its theoretical oxidation states; and each Q is a hydrocarbon having from 1-20 carbon atoms or is a halogen; wherein the bilateral symmetry of the CpR$_q$ group is maintained. Thus, preferably the CpR$_q$ group is symmetrically substituted.

The substituent or substituents present on the cyclopentadiene, indene and fluorine rings in the above-described catalysts are not particularly limited. The above rings, when comprising more than one substituent, may be substituted with the same substituent throughout, or with different substituents. Typically the substituents are independently selected from an aryl group and a hydrocarbyl group having from 1-20 carbon atoms. The most preferred substituents are methyl groups. Other preferred substituents include Et, n-Pr, i-Pr, n-Bu, t-Bu, Me$_3$Si, R-O, cycloalkyl, and halogen.

The type of bridge present between the rings in the above-described catalysts is not itself particularly limited. Typically R" comprises an alkylidene group having 1 to 20 carbon atoms, a germanium group (e.g. a dialkyl germanium group), a silicon group (e.g. a dialkyl silicon group), a siloxane group (e.g. a dialkyl siloxane group), an alkyl phosphine group or an amine group. Preferably, the substituent comprises a silyl radical or a hydrocarbyl radical having at least one carbon atom to form the bridge, such as a substituted or unsubstituted ethylenyl radical (e.g. —CH$_2$CH$_2$—). Most preferably R" is isopropylidene (Me$_2$C), Ph$_2$C, ethylenyl, or Me$_2$Si. It is particularly preferred that catalyst components comprising a bisindenyl moiety comprise an ethylenyl or an Me$_2$Si bridge, whilst catalyst components comprising a cyclopentadienyl-fluorenyl moiety comprise an Me$_2$C, Ph$_2$C, or Me$_2$Si bridge.

Some specific examples of preferred catalysts according to the present invention are the following:

A (iPP Catalysts):
Me$_2$Si(2-Me-Benz-Ind)$_2$ ZrCl$_2$
Me$_2$Si(2-Me-4-Naphthyl-Ind)$_2$ ZrCl$_2$
Me$_2$Si(2-Me-Ind)$_2$ ZrCl$_2$
Ph$_2$C(t-BuCp)(Flu) ZrCl$_2$
Et(Ind)$_2$ ZrCl$_2$
Et(IndH$_4$)$_2$ ZrCl$_2$
Me$_2$Si(2-Me-4,5Benzyl-Ind)$_2$ ZrCl$_2$
(R1R2Cp-Flu)RZrCl2
A' (iPP Block Catalysts)
Ph$_2$C(3-Me$_3$Si-Cp)(Flu) ZrCl$_2$
B (sPP Catalysts)
Ph$_2$C(Cp)(Flu) ZrCl$_2$
B' (sPP Block Catalysts)
Me$_2$S(t-BuN)(2,7-di-t-Bu-Flu) ZrCl$_2$ The catalyst components (i) and (ii) of the present catalyst system can be mixed by a physical process (physical blending), such as by slurrying a powdered form of the catalysts together in a hydrocarbon solvent. Alternatively components (i) and (ii) can be mixed by a chemical process (chemical blending). Chemical blending can be effected by, for example, forming a solution containing both catalysts (i) and (ii) and adding the solution to the support. It is preferred that chemical blending is carried out by immobilising both catalyst (i) and catalyst (ii) on a solid support in such a manner that one or more individual particles of the solid support have both catalyst (i) and catalyst (ii) immobilised on them.

The proportion of catalyst (i) to catalyst (ii) in the present catalyst system is not especially limited, and depends on the ratio of isotactic to syndiotactic polymer required in the final product. This will be dependent on the particular application for which the product is to be used. Typically, the proportion of catalyst (i) to catalyst (ii) is such that the final isotactic/syndiotactic blend comprises 50 wt. % or more isotactic polyolefin and from 0.5-50 wt. % of syndiotactic polyolefin.

More preferably, the final blend comprises from 0.3-15 wt. % of syndiotactic polyolefin and most preferably from 1-10 wt. % of syndiotactic polyolefin.

In order to produce polyolefin blends displaying an especially high degree of homogeneity (and consequently especially favourable properties) it is preferred that the present catalyst system comprises a catalyst component capable of producing a polyolefin comprising both isotactic polyolefin blocks and syndiotactic or atactic polyolefin blocks (an A' catalyst), or a catalyst capable of producing a polyolefin comprising both syndiotactic polyolefin blocks and isotactic or atactic polyolefin blocks (a B' catalyst). In the context of the present invention, these catalysts are termed stereoblock catalysts. Preferred catalyst components of this type are those capable of producing a polyolefin comprising both isotactic and syndiotactic polyolefin blocks (i.e. A'B' catalyst components). It is particularly preferred that the present catalyst system comprises an A component, a B component and an A'B' component.

Without being bound by theory, it is believed that, since the polyolefins produced by the stereoblock catalysts comprise both isotactic and syndiotactic units, they mix more readily with isotactic and syndiotactic homopolymers than these homopolymers do with each other. Thus, the inclusion of one or more stereoblock catalysts in the present catalyst system improves miscibility, i.e. it ensures that the polyolefin blend produced comprises a polymer that promotes mixing between the isotactic and syndiotactic polyolefins. The resulting polymer blend is thus more homogeneous than would otherwise be the case. Consequently the polymer has fewer weak spots in the crystal structure, leading to significant improvements in its mechanical strength.

In addition to the above catalyst components (i) and (ii), the catalyst system of the present invention may comprise one or more co-catalysts capable of activating any one or more of the catalyst components. Typically, the co-catalyst comprises an aluminium- or boron-containing co-catalyst.

Suitable aluminium-containing co-catalysts comprise an alumoxane, an alkyl aluminium compound and/or a Lewis acid.

The alumoxanes that can be used in the present invention are well known and preferably comprise oligomeric linear and/or cyclic alkyl alumoxanes represented by the formula (I):

for oligomeric linear alumoxanes; and formula (II)

for oligomeric cyclic alumoxanes, wherein n is 1-40, preferably 10-20; m is 3-40, preferably 3-20; and R is a C$_1$-C$_1$-C$_8$ alkyl group, preferably methyl. Generally, in the preparation of alumoxanes from, for example, aluminium trimethyl and water, a mixture of linear and cyclic compounds is obtained.

Suitable boron-containing co-catalysts may comprise a triphenylcarbenium boronate, such as tetrakis-pentafluorophenyl-borato-triphenylcarbenium as described in EP-A-0427696:

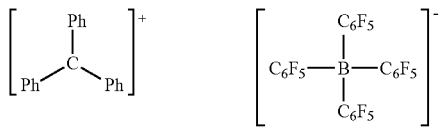

or those of the general formula below, as described in EP-A-0277004 (page 6, line 30 to page 7, line 7):

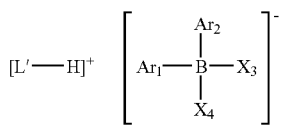

The catalyst system of the present invention may be employed in any method, provided that the required catalytic activity is not impaired. In a preferred embodiment of the present invention, the catalyst system is employed in a solution polymerisation process, which is homogeneous, or a slurry process, which is heterogeneous. In a solution process, typical solvents include hydrocarbons having 4-7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finely divided form.

Suitable inorganic oxide materials which are desirably employed in accordance with this invention include group IIA, IIIA, IVA, or IVB metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalised polyolefins such as finely divided polyethylene.

Preferably, the support is a silica support having a surface area of from 200-700 $m^2/g$ and a pore volume of from 0.5-3 ml/g.

The amount of alumoxane and metallocenes usefully employed in the preparation of the solid support catalyst can vary over a wide range. Preferably the aluminium to transition metal mole ratio is in the range 1:1 to 130:1, preferably 1:1 to 100:1, more preferably 5:1 to 70:1 and most preferably 5:1 to 50:1.

The order of addition of the catalyst components and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the catalyst components is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene and diethylbenzene.

Preferably the support material is slurried in toluene and the catalyst components and alumoxane are dissolved in toluene prior to addition to the support material.

The polyolefins that catalysts (i) and (ii) are capable of producing are not particularly limited, except that the monomeric olefin unit forming each polyolefin must have three or more carbon atoms. It is particularly preferred that both of catalyst components (i) and (ii) are capable of producing polypropylene.

The catalyst system of the present invention is used in the method of the present invention to produce blends of isotactic polyolefin and syndiotactic polyolefin. It is especially preferred that the method of the present invention is a method of producing a blend of isotactic polypropylene and syndiotactic polypropylene (an iPP/sPP blend).

The conditions employed for polymerisation in the method of the present invention are not particularly limited, provided they are sufficient to effectively polymerise the particular monomeric olefin used as a starting material. Typical polymerisation conditions in a slurry polymerisation are at a temperature of from 20-120° C., a pressure of from 0.1-5.6 MPa and a reaction time of from 10 mins to 4 hours.

The polyolefin blends of the present invention, and in particular the iPP/sPP, blends may be used to produce fibres. For the production of spunlaid iPP/sPP fibres, a typical extrusion temperature is in the range of from 200-260° C., most typically from 230-250° C. For the production of staple fibres, a typical extrusion temperature would be in the range of from 230-330° C., most typically from 280-300° C.

Fibres produced in accordance with the present invention may be produced from iPP/sPP blends having other additives to improve the mechanical processing or spinnability of the fibres. The fibres may be used to produce non-woven fabrics for use in filtration; in personal care products such as wipers, diapers, feminine hygiene products and incontinence products; in medical products such as wound dressings, surgical gowns, bandages and surgical drapes; in protective covers; in outdoor fabrics and in geotextiles. Non-woven fabrics made with iPP/sPP fibres can be part of such products, or constitute entirely the products. As well as making non-woven fabrics, the fibres may also be employed to make a woven knitted fabric or mat. The non-woven fabrics produced from the fibres in accordance with the invention can be produced by several processes, such as air through blowing, melt blowing, spun bonding or bonded carded processes. The fibres may also be formed as a non-woven spunlace product which is formed without thermal bonding by fibres being entangled together to form a fabric by the application of a high pressure fluid such as air or water.

The invention will now be described in further detail by way of example only, with reference to the following specific embodiments.

EXAMPLES

Catalysts of type A (iPP) were prepared in accordance with F. Wild, L. Zsolnai, G. Hutter and H. H. Brintzinger, J. Organomet. Chem., 232, 233, 1982. Catalysts of type A' (iPP/sPP) were prepared in accordance with A. Razavi, "Presentation to International Business Forum on Speciality Polyolefins" Sep. 22-24, 1992. Catalysts of type B (sPP) were prepared in accordance with the method of Razavi and Ferrara as published in the J. Organomet. Chem., 435, 299, 1992.

Example 1

Catalyst Preparation $(Me_2Si)(2-Me-4,5-Benzyl-Ind)_2ZrCl_2$ (a catalyst A) and $(Ph_2C)(Cp)(Flu)ZrCl_2$ (a catalyst B) were prepared.

Catalyst A Preparation—Two Steps Procedure

The support used was silica having a total pore volume of 4.22 ml/g and a surface area of 322 m$^2$/g. This silica was dried in a fluidised bed reactor (for 6 hours at 150° C. with 75 Nl of $H_2$) to remove the physically absorbed water.

5 g of this dried silica were suspended in 100 ml of dried toluene in a round bottom flask equipped with a magnetic stirrer, a nitrogen inlet and a dropping funnel. A 30wt % MAO solution in toluene (0.7-1.3 weight equivalents of MAO to silica, preferably 0.9 weight equivalents) was added dropwise to the silica suspension at room temperature. A reaction between MAO and the hydroxyl groups of the silica occurred, and the exothermic reaction (10° C. temperature rise) was accompanied by methane gas release. The slurry was heated to 110° C. and allowed to react for 4 hours at toluene reflux. The suspension was then filtered on a frit funnel. The reaction product was washed until the filtrate was substantially free of MAO. After the washing with toluene, the precipitate was then washed with pentane to facilitate drying. The support was finally dried under a mild vacuum. 9.7 g of support was obtained as a white powder.

To produce the activated catalyst, the metallocene $(Me_2Si)(2-Me-4,5-Benzyl-Ind)_2ZrCl_2$ (2 to 6 wt % of metallocene loading on the final catalyst, preferably 4 wt %) was dissolved in toluene and added to the toluene suspended reaction product of silica and MAO at room temperature. Reaction was allowed to take place for 2 hours at room temperature to form the active sites by reaction of the remaining aluminium alkyl functions on the support with the metallocene. The suspension was filtered and washed with toluene until filtrate was colourless. The precipitate was then washed with pentane to facilitate drying and finally dried under mild vacuum.

Catalyst B Preparation—One Pot Procedure.

The support used was silica having a total pore volume of 4.22 ml/g and a surface area of 322 m$^2$/g. This silica was dried in a fluidised bed reactor (for 6 hours at 150° C. with 75 Nl of $H_2$) to remove the physically absorbed water.

5 g of this dried silica were suspended in 100 ml of dried toluene in a round bottom flask equipped with a magnetic stirrer, a nitrogen inlet and a dropping funnel. In this procedure, the ion pair was formed by initial reaction of MAO solution with the metallocene $(Ph_2C)(CP)(Flu)ZrCl_2$ (2 to 6 wt % of metallocene to final catalyst, preferably 6 wt %). The ion pair solution was then added to the silica/toluene suspension (0.7-1.3 weight equivalents of MAO to silica, preferably 0.9 wt equivalents). The suspension was allowed to react for 4 hours at toluene reflux. The resulting slurry was filtered and washed with toluene and pentane and finally dried under mild vacuum.

Physical Blends of Catalysts Preparation

To produce a physical blend of supported catalysts, powder of each supported metallocene catalyst was mixed to produced 75:25, 83:17 and 90:10 physical blends of catalyst A:catalyst B. In each case, the catalyst system comprised a 6 wt.% loading of metallocene.

Example 2

Catalyst Preparation $(Me_2Si)(2-Me-Ind)_2ZrCl_2$ (a catalyst A) and $(Ph_2C)(Cp)(Flu)ZrCl_2$ (a catalyst B) were prepared.

Catalyst A Preparation—Two Steps Procedure

The catalyst system was prepared according to the two steps procedure described above in Example 1.

Catalyst B Preparation—One Pot Procedure

The catalyst system was prepared according to the one pot procedure described above in Example 1.

Physical Blends of Catalysts Preparation

A physical blend of supported catalysts was produced by mixing powder of each supported metallocene catalyst to produce a 72:25 physical blend of catalyst A:catalyst B. In each case, the catalyst system comprised a 6 wt. % loading of metallocene.

Example 3

Catalyst Preparation—Two Steps Procedure $(Ph_2C)((Me_3Si)Cp)(Flu)ZrCl_2$ (a catalyst A') and $(Ph_2C)(Cp)(Flu)ZrCl_2$ (a catalyst B) were prepared.

The support used was silica having a total pore volume of 4.22 ml/g and a surface area of 322 m$^2$/g. This silica was dried in a fluidised bed reactor (for 6 hours at 150° C. with 75 Nl of $H_2$) to remove the physically absorbed water.

5 g of this dried silica were suspended in 100 ml of dried toluene in a round bottom flask equipped with a magnetic stirrer, a nitrogen inlet and a dropping funnel. A 30 wt. % MAO solution in toluene (0.7-1.3 weight equivalents of MAO to silica, preferably 0.9 weight equivalents) was added dropwise to the silica suspension at room temperature. A reaction between MAO and the hydroxyl groups of the silica occurred, and the exothermic reaction (10° C. temperature rise) was accompanied by methane gas release. The slurry was heated to 110° C. and allowed to react for 4 hours at toluene reflux. The suspension was then filtered on a frit funnel. The reaction product was washed until the filtrate was substantially free of MAO. After the washing with toluene, the precipitate was then washed with pentane to facilitate drying. The support was finally dried under a mild vacuum. 9.7 g of support was obtained as a white powder.

To produce the activated catalyst, the metallocenes $(Ph_2C)((Me_3Si)Cp)(Flu)ZrCl_2$ and $(Ph_2C)(Cp)(Flu)ZrCl_2$ were dissolved in toluene and added to toluene suspended reaction product of silica and MAO at room temperature. Reaction was allowed to take place for 2 hours at room temperature to form the active sites by reaction of the remaining aluminium alkyl functions on the support with the metallocene. The suspension was filtered and washed with toluene until filtrate was colourless. The precipitate was then washed with pentane to facilitate drying and finally dried under mild vacuum to produce an 80:20 (by weight) chemical blend of catalyst A':catalyst B. This procedure was repeated to produce 90:10 and 95:5 chemical blends of A':B. The total loading of metallocenes was 6 wt.%.

Polymerisation of Propylene

Each of the above catalyst systems, as well as systems comprising only the individual catalyst components, were used to polymerise propylene. 2 litres of liquid propylene were polymerised using 100 mg of each catalyst.

Example 1

Table 1 below shows the results of microtacticity analysis from $^{13}$C NMR data in which the percent of mmmm pentads decreases as the content of Benzyl-Ind catalyst in the catalyst system decreases.

TABLE 1

| Catalyst | Wt. % sPP | % mmmm | % rrrr | % m | % r |
|---|---|---|---|---|---|
| *Catalysts of Example 1* | | | | | |
| *iPP and sPP catalysts alone* | | | | | |
| Benzyl-Ind (iPP) | — | 93.7 | 0.37 | 97.4 | 2.6 |
| Cp (sPP) | — | 2.4 | 75.4 | 10.2 | 89.8 |
| *Physical blends of iPP and sPP catalysts* | | | | | |
| Benzyl-Ind/Cp; 75/25 | 28.3 | 69.3 | 19.2 | 74.9 | 25.1 |
| Benzyl-Ind/Cp; 83/17 | 21.7 | 76.3 | 13.2 | 81.5 | 18.5 |
| Benzyl-Ind/Cp; 90/10 | 7.5 | 87.6 | 3.7 | 92.5 | 7.5 |

Example 2

Table 2 below shows the results of microtacticity analysis from $^{13}$C NMR data in which the percent of mmmm pentads decreases as the content of Me-Ind catalyst in the catalyst system decreases.

TABLE 2

| Catalyst | Wt. % sPP | % mmmm | % rrrr | % m | % r |
|---|---|---|---|---|---|
| *Catalysts of Example 2* | | | | | |
| *iPP and sPP catalysts alone* | | | | | |
| Me-Ind (iPP) | — | 93.4 | 0.0 | 97.4 | 2.3 |
| Cp (sPP) | — | 2.4 | 75.4 | 10.2 | 89.8 |
| *Physical blend of iPP and sPP catalysts* | | | | | |
| Me-Ind/Cp; 75/25 | — | 78.4 | 12.3 | 83.4 | 16.6 |

Example 3

Table 3 below shows the results of microtacticity analysis from $^{13}$C NMR data in which, for both the chemically and physically blended catalyst systems, the percent of mmmm pentads increases as the content of TMSCp catalyst in the catalyst system increases.

TABLE 3

| Catalyst | Wt. % iPP in sPP | % mmmm | % rrrr | % m | % r |
|---|---|---|---|---|---|
| *iPP/sPP and sPP catalysts alone* | | | | | |
| TMSCp (iPP/sPP) | — | 53.8 | 17.5 | 69.9 | 30.1 |
| Cp (sPP) | — | 2.4 | 75.4 | 10.2 | 89.8 |
| *Physical blends of iPP/sPP and sPP catalysts* | | | | | |
| TMSCp/Cp; 50/50 | 1.0 | 3.0 | 75.0 | 10.8 | 89.2 |
| TMSCp/Cp; 75/25 | 8.5 | 6.8 | 70.5 | 15.2 | 84.8 |
| TMSCp/Cp; 90/10 | 22.3 | 13.9 | 63.1 | 23.5 | 76.5 |
| *Chemical blends of iPP/sPP and sPP catalysts* | | | | | |
| TMSCp/Cp; 80/20 | 5.0 | 4.3 | 72.6 | 13.2 | 86.8 |
| TMSCp/Cp; 90/10 | 20.0 | 11.9 | 63.6 | 22.2 | 77.8 |
| TMSCp/Cp; 95/5 | 30.0 | 17.5 | 57.7 | 28.1 | 71.9 |

The invention claimed is:

1. A catalyst system for producing a polyolefin blend, which catalyst system comprises a mixture of a first catalyst component supported on a first support and a second catalyst component supported on a second support, wherein the first catalyst component is at least one of a catalyst component A capable of producing an isotactic olefin polymer, and a catalyst component A' capable of producing a polymer comprising an isotactic polyolefin block; and the second catalyst component is at least one of a catalyst component B capable of producing an syndiotactic polyolefin, and a catalyst component B' capable of producing a polymer comprising an syndiotactic polyolefin block;

wherein each of the components in the catalyst system is distinct from the other components in the catalyst system, and wherein the catalyst component A comprises at least one metallocene having the formula:

$$R''(CpR^1R^2)(Cp'R'n)MQ_2 \qquad (1)$$

wherein:

(CpR$^1$R$^2$) is a substituted cyclopentadienyl ring; (Cp'R'n) is a substituted or unsubstituted fluorenyl ring; R'' is a structural bridge imparting stereorigidity to the component; R$^1$ is a substituent on the cyclopentadienyl ring which is distal to the bridge, which distal substituent comprises a bulky group of the formula XR*$_3$ in which X is an atom from group IVA and each R* is the same or different and is chosen from a hydrogen or a hydrocarbyl group having from 1-20 carbon atoms, R$^2$ is a substituent on the cyclopentadienyl ring which is proximal to the bridge and positioned non-vicinal to the distal substituent and is a hydrogen or is of the formula YR#$_3$ in which Y is an atom from group IVA, and each R# is the same or different and is chosen from a hydrogen or a hydrocarbyl group having from 1-7 carbon atoms, each R' is the same or different and is a hydrocarbyl group having from 1-20 carbon atoms, and n is an integer of from 0-8; M is a metal atom from group IVB or is vanadium; and each Q is a hydrocarbon having from 1-20 carbon atoms or is a halogen; or the formula:

$$(Ind)_2R'MQ_2 \qquad (2)$$

or the formula:

$$(IndH_4)_2R''MQ_2 \qquad (3)$$

wherein:

each Ind is the same or different and is a substituted or unsubstituted indenyl group, wherein each IndH$_4$ is the same or different and is a substituted or unsubstituted tetrahydroindenyl group, R' is a structural bridge imparting stereorigidity to the component, R'' is a structural bridge imparting stereorigidity to the component; M is a metal atom from group IVB or is vanadium; and each Q is a hydrocarbon having from 1-20 carbon atoms or is a halogen, wherein the catalyst component B has the formula:

$$R''(CpR_m)(Cp'R'_r)MQ_2 \quad (4)$$

wherein:
(CpR$_m$) is a substituted or unsubstituted cyclopentadienyl ring; (Cp'R'$_r$) is a substituted or unsubstituted fluorenyl ring; R" is a structural bridge imparting stereorigidity to the component, each R is the same or different and is a hydrocarbyl group having from 1-20 carbon atoms; each R' is the same or different and is a hydrocarbyl group having from 1-20 carbon atoms; m is an integer of from 0-4; r is an integer from 0-8; M is a metal atom from group IVB or is vanadium; and each Q is a hydrocarbon having from 1-20 carbon atoms or is a halogen, wherein the catalyst component A' has the formula:

$$R''(CpR_x)(Cp'R'y)MQ_2 \quad (5)$$

wherein:
(CpR$_x$) is a substituted cyclopentadienyl ring; (Cp'R'y) is a substituted or unsubstituted fluorenyl ring; R" is a structural bridge imparting stereorigidity to the component; each R is the same or different and is a hydrocarbyl group having from 1-20 carbon atoms, each R' is the same or different and is a hydrocarbyl group having from 1-20 carbon atoms and x and y are independently an integer of from 1-4 and 0-8 respectively; M is a metal atom from group IVB or is vanadium; and each Q is a hydrocarbon having from 1-20 carbon atoms or is a halogen;
wherein the CpR$_x$ group lack bilateral symmetry, and wherein the catalyst component B' has the formula:

$$R''(CpR_q)XMQ_2 \quad (6)$$

wherein:
CpR$_q$ is a substituted cyclopentadienyl ring or a substituted or unsubstituted fluorenyl ring; R" is a structural bridge between Cp and X imparting stereorigidity to the component; each R is the same or different and is selected from a hydrocarbyl group having from 1-20 carbon atoms, a halogen, an alkoxy group, and alkoxyalkyl group, an alkoxyalkyl group, an alkkylamino group or an alkylsilylo group when Cp is a cyclopentadienyl ring, q is an integer from 0-4; and when Cp is a fluorenyl ring q is an integer from 0-8; X is a heteroatom from group VA or group VIA; M is a metal atom from group IIIB, IVB, VB or VIB in any of its theoretical oxidation states; and each Q is a hydrocarbon having from 1-20 carbon atoms or is a halogen; wherein the bilateral symmetry of the CpR$_q$ group is maintained.

2. A catalyst system according to claim 1, wherein M is Ti, Zr, or Hf.

3. A catalyst system according to claim 2, wherein Q is Cl.

4. A catalyst system according to claim 1, wherein R" is substituted or unsubstituted and comprises an alkylene radical having from 1-20 carbon atoms, a dialkyl germanium group, a dialkyl silicon group, a dialkyl siloxane group, an alkyl phosphine radical or an amine radical.

5. A catalyst system according to claim 4, wherein R" comprises an isopropylidene, (Me$_2$C), Ph$_2$C, ethylenyl or Me$_2$Si group.

6. A catalyst system according to claim 1, further comprising an aluminum- or boron-containing activating agent capable of activating at least one of said first catalyst component and said second catalyst component.

7. A catalyst system according to claim 1, wherein catalyst component A is capable of producing isotactic polypropylene and catalyst component B is capable of producing syndiotactie polypropylene.

8. A catalyst system according to claim 1 wherein the first catalyst component comprises a catalyst component A as defined by formula (1) wherein R$^1$ is a substituent on the cyclopentadienyl ring Cp, at a position which is distal to the bridge R" and R$^2$ is a substituent on the cyclopentadienyl ring Cp, at a position which is proximal to the bridge R" and is positioned non-vicinal to the distal substituent R$^1$.

9. A catalyst system according to claim 1, wherein the first catalyst component is a metallocene according to formula (2) or (3), in which R" is a C$_1$-C$_4$ alkylene group.

10. A catalyst system according to claim 1, wherein the second catalyst component is a catalyst component B according to formula (4), in which the group CpR$_m$ has bilateral symmetry.

11. A catalyst system according to claim 10 in which the value of m is 0 to provide that the group CpR$_m$ is unsubstituted.

12. A catalyst system according to claim 1, wherein the first catalyst component comprises a catalyst component A' as characterized by formula (5) in which the group CpR$_x$ lacks bilateral symmetry.

13. A catalyst system according to claim 12 wherein the group CpR$_x$ is substituted at the 3 position.

14. A catalyst system according to claim 13 wherein the substituent K is a trimethylsilyl group.

15. A catalyst system according to claim 1, wherein the second catalyst component comprises a catalyst component B as characterized by formula (6), in which the group CpR$_q$ is a symmetrically substituted cyclopentadienyl group or fluorenyl group.

16. A process for producing a blend of an isotactic polyolefin and a syndiotactie polyolefin, which comprises:
a. providing a catalyst system for producing a polyolefin blend, which catalyst system comprises a mixture of a first catalyst component supported on a first support and a second catalyst component supported on a second support, wherein the first catalyst component is s at least one of a catalyst component A capable of producing an isotactie olefin polymer, and a catalyst component A' capable of producing a polymer comprising an isotactic polyolefin block; and the second catalyst component is at least one of a catalyst component B capable of producing an syndiotactic polyolefin, and a catalyst component B' capable of producing a polymer comprising an syndiotactic polyolefin block;
wherein each of the components in the catalyst system is distinct from the other components in the catalyst system, and
wherein the catalyst component A comprises at least one metallocene having the formula:

$$R''(CpR'Rb(cp'R'n)MQ_2 \quad (1)$$

wherein:
(CpR$^1$R$^2$) is a substituted cyclopentadienyl ring; (Cp'R'n) is a substituted or unsubstituted fluorenyl ring; R" is a structural bridge imparting stereorigidity to the component; R$^1$ is a substituent on the cyclopentadienyl ring which is distal to the bridge, which distal substituent comprises a bulky group of the formula XR*$_3$ in which X is an atom from group IVA and each R* is the same or different and is chosen from a hydrogen or a hydrocarbyl group having from 1-20 carbon atoms, R$^2$ is a substituent on the cyclopentadienyl ring which is proximal to the bridge and positioned non-vicinal to the distal substituent and is a hydrogen or is of the formula $YR\#_3$ in which Y is an atom from group IVA, and each R# is the same or different and is chosen from a hydrogen or a hydrocarbyl group having from 1-7 carbon atoms, each R' is the same or different and is a hydrocarbyl group having from 1-20 carbon atoms, and n is an integer of from 0-8; M is a metal atom from group IVB or is vanadium; and each Q is a hydrocarbon having from 1-20 carbon atoms or is a halogen;

or the formula:

$$(Ind)_2R'MQ_2 \qquad (2)$$

or the formula:

$$(IndH_4)_2R''MQ_2 \qquad (3)$$

wherein:

each md is the same or different and is a substituted or unsubstituted indenyl group, wherein each IndU4 is the same or different and is a substituted or unsubstituted tetrahydroindenyl group, R' is a structural bridge imparting stereorigidity to the component, R" is a structural bridge imparting stercorigidity to the component; M is a metal atom from group IVB or is vanadium; and each Q is a hydrocarbon having from 1-20 carbon atoms or is a halogen, wherein the catalyst component B has the formula:

$$R''(CPR_m)(Cp'R'_r)MQ_2 \qquad (4)$$

wherein:

$(CpR_m)$ is a substituted or unsubstituted cyclopentadienyl ring; $(Cp'R'_r)$ is a substituted or unsubstituted fluorenyl ring; R" is a structural bridge imparting stereorigidity to the component, each R is the same or different and is a hydrocarbyl group having from 1-20 carbon atoms; each R' is the same or different and is a hydrocarbyl group having from 1-20 carbon atoms; m is an integer of from 0-4; r is an integer from 0-8; M is a metal atom from group IVB or is vanadium; and each Q is a hydrocarbon having from 1-20 carbon atoms or is a halogen, wherein the catalyst component A' has the formula:

$$R''(CpR_x)(Cp'R'y)MQ_2 \qquad (5)$$

wherein:

$(CpR_x)$ is a substituted cyclopentadienyl ring; $(Cp'R'y)$ is a substituted or unsubstituted fluorenyl ring; R" is a structural bridge imparting stereorigidity to the component; each R is the same or different and is a hydrocarbyl group having from 1-20 carbon atoms, each R' is the same or different and is a hydrocarbyl group having from 1-20 carbon atoms and x and y are independently an integer of from 1-4 and 0-8 respectively; M is a metal atom from group IVB or is vanadium; and each Q is a hydrocarbon having from 1-20 carbon atoms or is a halogen; wherein the $CpR_x$ group lack bilateral symmetry, and wherein the catalyst component B' has the formula:

$$R''(CpR_q)XMQ_2 \qquad (6)$$

wherein:

CpRq is a substituted cyclopentadienyl ring or a substituted or unsubstituted fluorenyl ring; R" is a structural bridge between Cp and X imparting stercorigidity to the component; each R is the same or different and is selected from a hydrocarbyl group having from 1-20 carbon atoms, an alkoxyalkyl group, an alkylamino group or an alkylsilylo group; from 0-4; and when Cp is a fluorenyl ring q is an integer from 0-8; X is a heteroatom from group VA or group VJA; M is a metal atom from group IIIB, IVB, VB or VIB in any of its theoretical oxidation states; and each Q is a hydrocarbon having from 1-20 carbon atoms or is a halogen; wherein the bilateral symmetry of the CpRq group is maintained; and further comprising a co-catalyst of an aluminum- or boron-containing activating agent capable of activating at least one of said first catalyst component and said second catalyst component;

b. contacting said catalyst system with an olefin monomer in a polymerization reaction zone under polymerization conditions to form a polyolefin product; and c. withdrawing said polyolefin product from said polymerization reaction zone.

17. The process of claim 16 wherein said olefin monomer is propylene.

18. The process of claim 17 wherein said first catalyst component is a catalyst component effective in the polymerization of propylene to produce isotactic polypropylene and said second catalyst component is a catalyst component effective in the polymerization of propylene to produce syndiotactic polypropylene, wherein the polyolcfm product withdrawn from said polymerization reaction zone is a mixture of isotactic polypropylene and syndiotactic polypropylene.

* * * * *